Sept. 12, 1939.  L. A. HAZELTINE  2,172,750

ELECTRON DISCHARGE DEVICE

Filed Jan. 31, 1936  4 Sheets—Sheet 1

INVENTOR.
LOUIS A. HAZELTINE,
BY Laurence B. Dodds
ATTORNEY.

Sept. 12, 1939.  L. A. HAZELTINE  2,172,750
ELECTRON DISCHARGE DEVICE
Filed Jan. 31, 1936  4 Sheets-Sheet 2

INVENTOR.
LOUIS A. HAZELTINE,
BY Laurence B Dodds
ATTORNEY.

Sept. 12, 1939.  L. A. HAZELTINE  2,172,750
ELECTRON DISCHARGE DEVICE
Filed Jan. 31, 1936   4 Sheets-Sheet 3

INVENTOR.
LOUIS A. HAZELTINE,
BY Laurence B. Dodds
ATTORNEY.

Sept. 12, 1939.  L. A. HAZELTINE  2,172,750
ELECTRON DISCHARGE DEVICE
Filed Jan. 31, 1936   4 Sheets-Sheet 4

INVENTOR.
LOUIS A. HAZELTINE,
BY
ATTORNEY.

Patented Sept. 12, 1939

2,172,750

UNITED STATES PATENT OFFICE 2,172,750

ELECTRON DISCHARGE DEVICE

Louis A. Hazeltine, Hoboken, N. J., assignor to Hazeltine Corporation, a corporation of Delaware Application January 31, 1936, Serial No. 61,820

15 Claims. (Cl. 250—27)

My invention relates to electron discharge devices and more particularly to thermionic vacuum tubes adapted to be used in high-frequency circuits.

It has heretofore been proposed to construct a thermionic vacuum tube having a pair of anodes, a pair of control electrodes and a single cathode. It has further been proposed to use a tube of this general construction for frequency conversion. Such a system employing a tube of the type noted is shown and described in United States Patent No. 1,343,306, to Carson, granted June 15, 1920. Tubes of this construction, known to the art, have not had extensive commercial use because, among other factors, their arrangement has been such that a relatively large variation in the control voltage applied between the control electrodes is required to produce the desired variation in the division of the current between the two anodes, with the result that a single tube of this type is inferior in operation to two separate three-electrode tubes.

It is an object of my invention to provide an electron discharge device of the two-anode type, which is of novel construction and arrangement and which operates in a new manner, such that the desired variation in the division of the current between the two anodes may be effected by relatively small variations in the control.

It is a further object of my invention to provide an electron discharge device which operates in the above-described manner, which is of simple structure, and which may be used in a wide variety of applications. More specifically, it is an object of my invention to provide such a device which is particularly suited for use in a frequency-converter circuit.

In accordance with my invention, I attain the above objects by providing an electron discharge device which includes a cathode, a pair of anodes positioned closely adjacent to each other, and control means so arranged that the electrons emitted by the cathode to the anodes are divided into a number of parallel streams which are deflected periodically and alternately from each of the two anodes toward the other, in accordance with variations in a periodic controlling potential, whereby the desired variations in the division of the current between the two anodes are obtained. With such an arrangement of the tube elements, a relatively small change in the control potential is sufficient to deflect the electron streams from one anode to the other, thereby to produce the desired variations in the division of the current between the two anodes.

Deflection of the electron streams alternately between the two anodes may be accomplished by providing a pair of control electrodes which are interposed between the cathode and the anodes and which may be excited from a source of alternating control voltage in such a manner that the alternating electrostatic field between the electrodes exerts the desired deflecting action on the electron streams.

One form of tube structure which may conveniently be employed for obtaining the desired separation of the electrons into a plurality of streams and alternate deflection of the streams toward one and then the other of the two anodes, is that obtained by constructing the control electrodes in the form of interleaved helices, coaxially disposed about the cathode and displaced therefrom either by equal or by unequal distances, and by constructing the anodes in a like manner to form a pair of interleaved helices which surround, and have the same helical pitch as, the control electrodes. As thus arranged, and with the respective turns of the anodes and the control electrodes registering, or lying in the same right helicoidal path around the cathode, the electrons emitted from the cathode to the anodes may be considered as being divided into several parallel streams which may be deflected from each anode to the other in response to alternate variations in the electrostatic field produced by differences of potential between the respective control electrodes and the tube cathode. The control electrodes may, in certain types of circuits, such for example as in frequency-converter circuits, be connected to two different sources of alternating voltages in such manner that one of the voltages acts to control the rate of electron emission from the cathode toward the anodes and the other voltage functions to control the deflection of the electron streams alternately from each anode toward the other. With this latter arrangement, a voltage of one frequency may be modulated by that of another frequency, and the voltage having either the sum or the difference frequency components therein may be selected by means of suitable filter circuits connected to the output electrodes of the device.

In an alternative embodiment of my invention, the electron emission from the cathode to the anodes is controlled by an additional electrode and the control electrodes described above function solely as a means for deflecting the electron streams from one anode toward the other anode. This additional control electrode performs a useful function when the tube is used in certain applications to be described in more detail hereinafter.

In another alternative embodiment of my invention, a single control electrode is provided within the envelope of the tube for controlling the rate of electron emission from the cathode, deflection of the electron streams being obtained by an electromagnetic field excited by a varying control current. The electromagnetic control means may take the form of a winding mounted outside the tube envelope and coaxial with the tube elements.

Various structural modifications of the tube may be employed which operate in the manner described above, and certain of these modifications will be described in the detailed description appearing in the following specification.

The novel features which I believe to be characteristic of my invention are set forth with particularity in the appended claims. My invention itself, however, both as to its organization and the method of operation, together with further objects and advantages thereof, will best be understood by reference to the following specification taken in connection with the accompanying drawings in which: Figs. 7–28, inclusive, illustrate different embodiments of my improved control device, together with circuits to which the respective modified control devices are applicable.

Figure 1:
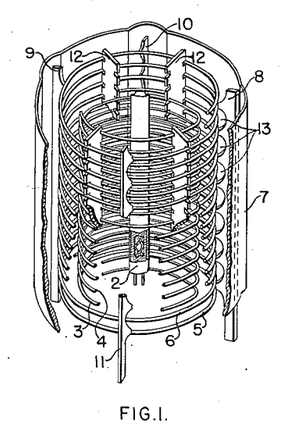
Fig. 1 is an enlarged perspective view, partially in section, illustrating an electron discharge device constructed in accordance with my invention, with the enclosing evacuated envelope omitted.
Figure 2:
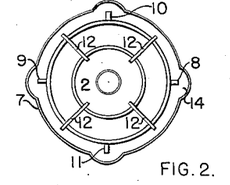
Fig. 2 is a top view of the electron discharge device shown in Fig. 1.
Figure 3:
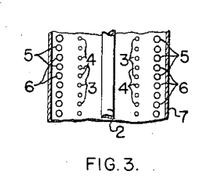
Fig. 3 is a fragmentary cross-sectional view of the electron discharge device shown in Fig. 1.

Referring now particularly to Figs. 1, 2 and 3 of the drawings, there is illustrated one embodiment of my invention, comprising a plurality of elements which may be supported by a press in the conventional manner. For purposes of clarity in describing the invention, the evacuated envelope within which the elements of the electron discharge device are to be mounted has been omitted from the drawings, but it will be understood that any form of envelope may be employed which is evacuated to a degree sufficient to insure substantially pure electron emission. The functional elements of the device comprise a cathode 2, which may alternatively be of the indirectly heated type, as shown, or of the directly heated filamentary type, a pair of control electrodes, or grids, 3 and 4, which surround the cathode, a pair of anodes 5 and 6, which surround the control electrodes, and a shield member 7, which encloses the anodes 5 and 6. In the embodiment of my invention illustrated, the control electrodes 3 and 4 are constructed in the form of interleaved helices which are coaxially disposed at equal distances from the cylindrical cathode 2 and interposed between the cathode 2 and the pair of anodes 5 and 6. The anodes 5 and 6 are constructed in a similar manner to form interleaved helices having the same pitch and the same direction of twist as the control electrodes, are coaxially disposed with respect to the cathode 2, and surround the control electrodes 3 and 4. With the electrodes arranged in this manner, the turns of the anodes register with the turns of the control electrodes.

Although any desired form of supporting means may be employed, the type of means illustrated will provide the necessary rigidity of the structure to maintain the respective electrodes in their proper relative positions. This means includes four metallic posts, 8, 9, 10 and 11, for supporting the anodes 5 and 6, and mica spacers 12, each provided with recesses along each edge thereof, which engage the turns of the anodes 5 and 6 and the turns of the control electrodes 3 and 4 to support the latter from the former. The metallic posts 8 and 9 may be spot-welded to the turns of the anode 5 at points displaced 180° and are provided with cut-out portions 13 opposite the turns of the anode 6 which prevent any electrical connection between the two anodes within the tube. Similarly, the metallic posts 10 and 11, which may be spot-welded to the anode 6, are provided with cut-out portions 13 for preventing an electrical connection between the two anodes. As shown in Fig. 2, the shield 7 may be provided with longitudinally extending depressions 14 to accommodate the four supporting posts 8–11, inclusive, and to permit the correct spacing of the shield with respect to the anodes without a conductive connection therebetween.

The relative positions occupied by the respective electrodes is best illustrated in the fragmentary cross-sectional view shown in Fig. 3. It will be seen that the turns of one of the control electrodes and the turns of one of the anodes lie in the same right helicoid. Thus, at the plane of cross-sectioning, the cross-sectioned surface of the electrode 3 is on a line perpendicular to the cathode 2 and passing through the anode 5. Similarly, and in the same plane, the cross-sectioned surface of the electrode 4 is on a line perpendicular to the cathode 2 and passing through the anode 6. This relationship is defined hereinafter by the phrase to the effect that the turns of the anodes register with the turns of the control electrodes.

With the above described arrangement of the elements, the two control electrodes function to separate the electrons flowing toward the anodes into a plurality of streams. For example, each turn of each of the helical anodes and control electrodes may be considered to be a section of the electrode of which it forms a part; the several sections, or turns, being connected together at their ends to form a continuous element. As thus considered, the helicoidal path extending substantially perpendicularly from the cathode and between each adjacent pair of single turns of the two control electrodes may be described as constituting a path for one electron stream, and this path will be seen to be parallel to the path of the stream flowing in the helicoidal path perpendicular to the cathode and extending between the next adjacent pairs of single turns of the control electrodes. The rate of electron emission may be controlled by the combined effect of the two control electrodes. Thus, if the instantaneous potentials of the electrodes 3 and 4 with respect to the cathode 2 are equal and are varied equally and simultaneously, as by the application of the same instantaneous component of a periodic voltage to both electrodes, the rate of emission of electrons will be varied accordingly, thereby to vary the magnitude of the current which can flow from either of the anodes 5 and 6 to the cathode 2. Also, the direction of the electron streams may be changed by varying the electrostatic field between the electrodes 3 and 4, whereby a greater proportion of the emitted electrons will reach one anode than the other anode. Thus, considering the two lowermost turns of the control electrodes and anodes shown in Fig. 3, if the electrode 3 alternately be made more negative with respect to the cathode 2 than the electrode 4, so that the electrostatic field between the two electrodes is varied, the electrons will alternately be deflected toward one and then the other of the anodes 5 and 6. It will, therefore, be seen that if an alternating voltage be impressed between the control electrodes 3 and 4 the electron streams will alternately be deflected from each anode toward the other.

It will, of course, be understood that the division of electrons between the two anodes will be influenced to a lesser degree by the relative potentials of the two anodes. For example, if anode 5 be made more positive with respect to the cathode 2 than the anode 6, the electrons will be attracted with greater intensity toward the anode 5, and vice versa. However, since the two anodes are at a greater distance from the cathode than the control electrodes, such variations in the relative potentials thereof have a lesser effect on the division of electrons between the two anodes than do variations in the relative potentials of the control electrodes 3 and 4.

It will be seen that the electrons which pass between the anodes 5 and 6 will, at least in part, be attracted back to these anodes; but some may reach the shield 7, particularly if the potential of the shield is not sufficiently negative to overcome the initial velocity of the electrons. In order to minimize this tendency, the shield 7 may be biased to a potential slightly negative with respect to the cathode 2 thereby to repel the electrons toward the two anodes. However, if the initial velocity of the electrons be sufficiently low, the negative bias may be omitted and the shield 7 connected directly to the cathode 2.

Figure 4:
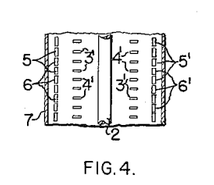
Fig. 4 is a similar view illustrating a modification of the electron discharge device shown in Fig. 1.

As a further example, and in order to improve the deflecting action of the control electrodes and to insure a more complete interception of the emitted electrons by one or the other of the two anodes, the structure illustrated in Fig. 4 may be employed. In this structure, the interleaved helically-wound control electrodes 3' and 4' are edge-wound strips so that the flat sides thereof lie parallel to the electron streams. The interleaved helical anodes 5' and 6' are flat-wound strips and are separated by a relatively small helical aperture. With this structure only a small obstructing surface is presented by the edges of the electrodes 3' and 4' to the passage of the electrons toward the anodes 5' and 6', and at the same time the relatively large surface of the flat control electrodes enhances the deflecting action for a given potential difference between the two control electrodes. Further, the relatively greater surface of the anodes 5' and 6' increases the portion of the electrons intercepted by the anodes and decreases the portion of the electrons which pass through the helical space between the anodes and to the shield 7.

The purpose of providing the shield 7 in each of the structures thus far described is threefold. In the first instance, the shield prevents the electrons which pass between the anodes from accumulating on the inner surface of the tube envelope and thereby prevents an undesired electrostatic charge from being built up on this surface. Secondly, the shield reduces the secondary emission of electrons from the momentarily less positive anode to the more positive anode. Thirdly, the shield acts as an electrostatic shield to reduce the capacitive couplings between the input circuit and the output circuit connected to the device. The shield is particularly effective in reducing the capacitive coupling between the two control electrodes jointly and the two anodes jointly.

Figure 5:
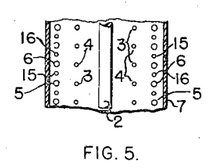
Fig. 5 similarly illustrates a further modification of the tube structure.

In order further to reduce secondary electron emission from one anode to the other anode and further to decrease the capacitance between the electrodes, the shield 7 may be provided with inwardly projecting helicoidal members or fins (not shown) which extend between the two anodes. Alternatively, the structure illustrated in Fig. 5 may be used, which includes auxiliary helical shielding electrodes 15 and 16 positioned between and coextensive with the turns of the two anodes. It will be understood that the electrodes 15 and 16 are connected to the shield 7 within the tube. It will further be understood that the two electrodes 15 and 16 need not be cocylindrical with the anodes 5 and 6 but may be coaxially disposed about the cathode 2 with a radius either greater or less than the radius of the two anodes. The function of these auxiliary electrodes, or of the fins, when connected to the cathode, is essentially that of a suppressor electrode as employed in the ordinary pentode tube.

Figure 6:
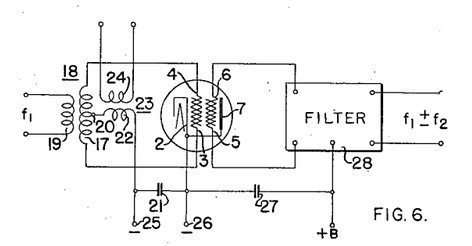
Fig. 6 is a schematic diagram of one form of circuit in which the device may advantageously be employed.

The operation of the electron discharge device described above will best be understood by reference to Fig. 6 wherein the device is shown as the active element for a frequency-converter system. In this system, the input electrodes 3 and 4 are connected to the terminals of the secondary winding 17 of a transformer 18 having its primary winding 19 connected to a source (not shown) of alternating voltage having a frequency $f_1$. The mid-point 20 of the secondary winding 17 is connected to the cathode 2 through a by-pass condenser 21 and the secondary winding 22 of a transformer 23. The primary winding 24 of the transformer 23 is connected to a second source (not shown) of alternating voltage having a different frequency $f_2$. In order to bias the control electrodes 3 and 4 to the proper negative potential with respect to the cathode 2, a source (not shown) of biasing potential may be connected between the terminals 25 and 26, the negative side of this source being connected to the terminal 25. The anodes 5 and 6 of the electron discharge control device are connected to the input terminals of a filter system, indicated schematically at 28, which may have its output terminals connected to any desired utilizing circuit (not shown). The circuits between the anodes 5 and 6 and the cathode 2 are completed through a source of anode potential, indicated as +B, shunted by a by-pass condenser 27.

It will be observed that the voltage having the frequency $f_2$ is simultaneously impressed on each of the control electrodes 3 and 4, thereby to vary the average potential thereof with respect to the cathode 2. In this manner the rate of electron emission from the cathode 2 to the anodes 5 and 6 is controlled in accordance with the variations in the alternating voltage applied to the terminals of the primary winding 24. Also, the control electrodes cause the emitted electrons to separate into a plurality of streams, as explained above, which, due to the positive potential of the anodes, travel toward the anodes. Simultaneously with the control of the electron emission, the electron streams thus formed are alternately deflected from each anode toward the other by the electrostatic field between the two control electrodes 3 and 4 produced by the alternating voltage impressed on the terminals of the primary winding 19. Thus, during one-half cycle of the voltage impressed on the transformer 18 the polarity of the electrostatic field between the control electrodes 3 and 4 causes the electron streams to be deflected toward the anode 5 while, during the other half cycle, the electrostatic field causes the electron streams to be deflected toward the anode 6. In this manner the anode current flowing toward the cathode 2 alternately proceeds mainly from one and then the other of the anodes 5 and 6 at a periodicity determined by the frequency of the voltage impressed on the transformer 18. Simultaneously, the magnitude of this anode current is varied by the variations in electron emission produced by the voltage impressed on the input terminals of the transformer 23. The anode currents, in flowing through the impedances of filter 28, built up a potential difference between the anodes 5 and 6 which has the frequency $f_1$ but which is modulated at the frequency $f_2$. The result is, in effect, the production of two potential differences whose frequencies are $f_1+f_2$ and $f_1-f_2$ and which exist across the input terminals of the filter. The filter 28 may be designed selectively to transmit to its output terminals a voltage having either of the two frequency components noted. It will be seen that, because of the symmetry of the arrangement, no voltage having a frequency $f_2$ is produced between the anodes 5 and 6.

It is known that the inherent capacitance between the anode and the control electrode of a vacuum tube causes coupling between the input and the output circuits connected thereto, which is often very undesirable and which is commonly made negligible by the interposition of a screen grid between the control electrode and the anode. In the embodiments of my invention thus far described, this expedient is unnecessary insofar as coupling between the input and output circuits is concerned, for the reason that each of these embodiments is almost completely self-neutralized. This is partly because each control electrode partly shields the other control electrode and each anode partly shields the other anode; but is mainly because each anode has nearly equal capacitances (which have opposite effects) to the two control electrodes and each control electrode, similarly, has nearly equal capacitances to the two anodes.

Figure 7:
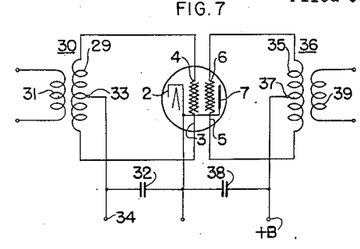

Although the circuit illustrated in Fig. 6 is designed to employ both electron deflection and electron emission control, it will be understood that the discharge device described is applicable for use in circuits wherein only one of the two types of control is to be utilized. It will be seen that, when emission control alone is used, the operation is essentially that of the ordinary three-electrode vacuum tube. The use of deflection control alone is shown in Fig. 7 as applied to a push-pull connected amplifier stage for amplifying currents of audio or radio frequency. In this circuit the control electrodes 3 and 4 are connected to the terminals of the secondary winding 29 of a transformer 30 having its primary winding 31 connected to a source (not shown) of high-frequency oscillations. The cathode 2 is connected through a by-pass condenser 32 to the mid-point 33 of the secondary winding 29. A suitable biasing potential may be applied to the control electrodes through the terminal 34. The output circuit of the amplifier includes the anodes 5 and 6 connected to the terminals of the primary winding 35 of a transformer 36, with the mid-point 37 of the winding 35 connected to a source of anode potential +B which is shunted by a by-pass condenser 38. The secondary winding 39 of the transformer 36 may be connected to any form of utilizing circuit as, for example, to the input electrodes of a succeeding amplifier stage in an amplifier system.

In the operation of the amplifier circuit illustrated in Fig. 7, the control of the anode current is produced by the deflection of the electron streams between the two anodes 5 and 6; the electron emission being determined by the magnitude of the negative biasing potential applied to the control electrodes 3 and 4 through the terminal 34. The deflecting action of the control electrodes 3 and 4 is identical with that described above, and, accordingly, a repetition of the mode of operation is deemed to be unnecessary. Since the deflection of the electron streams is substantially proportional to the potential difference between the control electrodes, up to the point at which the streams are entirely deflected from one anode to the other, and since the electron emission is constant throughout each cycle, the amplification will be substantially linear, if the signal level is kept within the limit mentioned. Thus distortion, which is a serious detriment in ordinary audio-frequency amplifiers, is obviated. The system of Fig. 7 also has the advantage that the two anode currents magnetically balance each other in the primary winding of transformer 36, thus preventing the biasing or the saturation of the iron core, if an iron core transformer be used.

From the foregoing description it will be apparent that my improved electron discharge device may advantageously be employed in a system analogous to a reflex amplifier system wherein a single active element, or tube, is used simultaneously to obtain audio- and radio-frequency amplification. Thus, in the circuit arrangement illustrated in Fig. 8 the deflecting action of the control electrodes 3 and 4 is utilized to secure audio-frequency amplification in the discharge device and the electron emission is varied in accordance with a radio-frequency voltage applied to both electrodes, thereby simultaneously to secure audio- and radio-frequency amplification in the same electron discharge device. To obtain these simultaneous control functions, the input circuit to the control electrodes 3 and 4 is coupled to a source of audio-frequency alternating current and a source of radio-frequency alternating current by means of transformers 40 and 41, respectively. The transformer 41 includes a pair of secondary windings 42 and 43 connected to the control electrodes 3 and 4, respectively, and to the cathode 2 through radio-frequency by-pass condensers 44 and 45. The audio-frequency voltage is impressed on the control electrodes by the secondary winding 46 of the transformer 40, the terminals of the winding 46 being connected to the electrodes 3 and 4, respectively, through the transformer secondary windings 42 and 43, respectively. A source (not shown) of biasing potential for maintaining the control electrodes 3 and 4 at the proper negative potential with respect to the cathode 2 may be applied to these electrodes through the terminal 47. The output circuit of the amplifier includes the anodes 5 and 6 connected to transformers 48 and 49 for impressing, respectively, the amplified radio-frequency and the amplified audio-frequency voltages on a pair of utilizing circuits (not shown).

Figure 8:
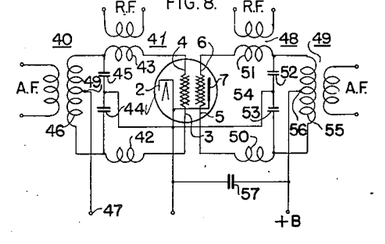

The radio-frequency branch of this output circuit includes primary windings 50 and 51 of the transformer 48 connected to the anodes 5 and 6 and a pair of radio-frequency by-pass condensers 52 and 53 having a common connection 54 to the cathode 2. The audio-frequency branch of the output circuit includes the primary winding 55 of the transformer 49 having its terminals connected to the anodes 5 and 6 through the windings 50 and 51 and its mid-point 56 connected to a source of anode potential +B which is shunted by a by-pass condenser 57.

In the operation of the amplifier illustrated in Fig. 8, the radio-frequency voltage applied to the input terminals of the transformer 41 controls the rate of electron emission from the cathode 2 to the anodes 5 and 6, it being understood that the control electrodes cause the electrons to separate into a plurality of streams, in the manner previously described. The audio-frequency voltage applied to the input terminals of the transformer 40 causes the electron streams to be deflected alternately from one toward the other of the two anodes, in the manner described in detail in the preceding paragraphs. The separation of the radio-frequency and audio-frequency components of current in the output circuit of the electron discharge control device is thought to be obvious, and, accordingly, a description thereof is omitted. With this circuit, the radio-frequency signal is not appreciably modulated by the audio-frequency signal in the manner which occurs when a conventional type of vacuum tube is employed to effect a simultaneous amplification of two signals having different frequencies. This is by virtue of the independence of the two controlling actions exerted by the control electrodes, namely, the control of the electron emission and that exerted by the deflecting action on the electron streams.

Figure 9:
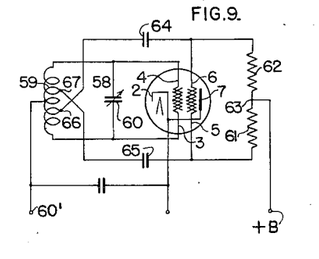

The deflecting action of the control electrodes of my improved electron discharge control device may, of course, be employed in regenerative systems wherein an output circuit is coupled to feed back energy to an input circuit in any convenient manner. A regenerative system of this general type is illustrated in Fig. 9, in the form of a push-pull connected electron discharge oscillator having a tunable input circuit 58, comprising an inductance 59 shunted by a variable tuning condenser 60, and having its terminals connected to the control electrodes 3 and 4. A negative biasing potential may be applied to the two control electrodes through the terminal 60'. The anode circuit of the oscillator includes a pair of resistances 61 and 62 connected to the anodes 5 and 6, respectively, and having their common connection 63 connected to the positive terminal of a source of anode potential +B. Energy is fed from the output electrodes to the tuned input circuit through the feed-back paths which include, respectively, the blocking condensers 64 and 65. Each feed-back path connects one anode to a point on the inductance 59 of the frequency-determining circuit having the opposite polarity to the corresponding control electrode. Thus, the path including the condenser 64 connects the anode 6 to a point 66 on the inductance 59 having an opposite polarity to the corresponding control electrode 4; and the path including the condenser 65 connects the anode 5 to a point 67 on the inductance 59 having an opposite polarity to that of the control electrode 3. With this circuit arrangement, the feed-back action of the electron discharge device is achieved entirely by the electron stream deflecting action of the two control electrodes.

The electron deflection control lends itself equally well to oscillators of the type including a tunable frequency-determining plate circuit. Thus, in the oscillator circuit illustrated in Fig. 10 the frequency-determining circuit 67', consisting of a parallel-connected inductance 68 and variable condenser 69, is included in the anode circuit connected between the anodes 5 and 6. Energy is fed to the control electrodes 3 and 4 by means of the feed-back paths which include direct-current blocking condensers 70 and 71. Electron emission control is achieved by suitable adjustment of the biasing potential applied to the control electrodes 3 and 4 through the terminal 72 and the resistances 73 and 74. It will be understood that, in this arrangement, the feed-back action of the electron discharge device is due entirely to the electron deflecting action of the control electrodes 3 and 4, in the previously described manner.

Figure 10:
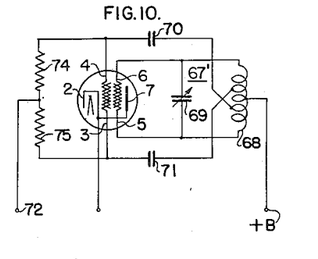

It will, of course, be understood that in either of the oscillator circuits illustrated in Figs. 9 and 10 the generated oscillations may be coupled to a utilizing circuit in any suitable manner as, for example, by inductively coupling such a circuit to the inductance of the frequency-determining circuit. In the operation of either of the two oscillator circuits with sufficient feed-back coupling, the electron streams will be almost completely deflected from one anode to the other in each cycle. Then the oscillations can be set at any desired strength by adjusting the biasing potential applied at 60' or 72, thereby to determine the electron emission; and the oscillations will remain stable even at very low amplitudes. One of the principal advantages of my improved device in the amplifier and oscillator circuits described resides in the fact that the total electron emission remains substantially constant. Also, the maximum emission required is equal to the maximum required on either half wave of the control voltage, whereas in any ordinary amplifier the maximum emission is double that value.

Figure 11:
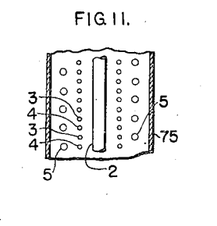

While I have described my improved electron discharge device as including a pair of interleaved anodes, it may be found to be desirable to omit one of these anodes and use the shield which encloses the other elements of the tube as the second anode. Such a structure is illustrated in Fig. 11, wherein the surrounding metal cylinder 75 may be connected as the second anode. The structure of the tube shown in this figure is otherwise identical with that illustrated in Fig. 1.

Figure 12:
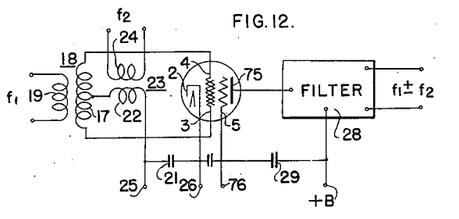

The omission of one of the helical anodes does not modify the operation of the tube to any marked degree, the deflecting action of the control electrodes 3 and 4 being such that the electron streams are deflected alternately toward one and then the other of the two anodes 5 and 75. It will, therefore, be apparent that this tube may be used in any of the previously described circuits without substantial modification thereof. It may be found to be desirable, however, to employ a frequency-converter circuit arrangement, as illustrated in Fig. 12, which is similar to that shown in Fig. 6 with the exception that only the anode 75 is directly connected in the output circuit, the anode 5 being maintained at a fixed positive potential by the application of voltage thereto through the terminal 76. In this circuit, the anode 5 functions as a screen grid between the control electrodes 3 and 4 and the single anode 75. As is usual in such circuits, the positive potential applied to the electrode 6 is maintained at a value less than that applied to the anode 75. Not only does the anode 6 serve in the usual manner of a screen grid greatly to decrease the capacitance between the anode 75 and the control electrodes, but the symmetrical arrangement of the control electrodes results in a large degree of self-neutralization, as described previously.

Although I have described the control electrodes 3 and 4 as being interleaved helices concentrically disposed about the cathode 2 and equally displaced therefrom, it may be found to be advantageous, from a manufacturing standpoint, to dispose the helices in such a manner that the turns are of different radii but arranged in staggered relation with respect to the cathode 2. Thus, in Fig. 13 I have shown the control electrode 4 as being a helix of larger diameter than the helix formed by the electrode 3 and concentrically positioned with respect to the cathode 2 about the control electrode 3, thus producing a dissymmetrical structure in which the turns of the electrode 4 surround the turns of the electrode 3.

Figure 13:
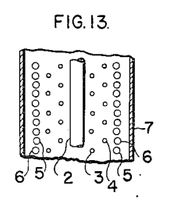
Figure 14:
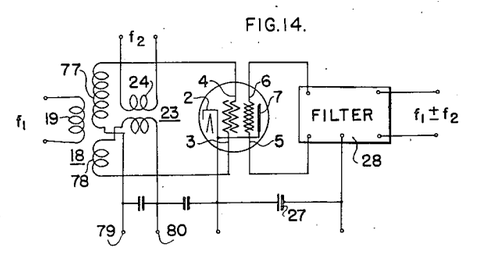

The dissymmetry of the structure of Fig. 13 does not alter the fundamental electron deflecting action of the control electrodes but it does make it desirable to employ an unsymmetrical input circuit connected between these two electrodes. Such an unsymmetrical circuit arrangement is shown in Fig. 14, which is similar to the frequency-converter circuit of Fig. 6 but differs therefrom in that the secondary winding of the transformer 18 is divided into two sections 77 and 78, having unequal numbers of turns. The coil 77, having the greater number of turns, is connected to the control electrode 4 farthest removed from the cathode 2; and the section 78, having the smaller number of turns, is connected to the control electrode 3 nearest the cathode 2. The operation of this circuit is fundamentally the same as that described in connection with the circuit of Fig. 6, the turn ratio of the windings 77 and 78 being adjusted so that fluctuations of the potentials applied to the control electrodes 3 and 4 by the transformer 18 do not produce any change in the total electron emission, and also so that the potential applied to the control electrodes 3 and 4 through transformer 23 does not affect the deflecting action of the electron streams. In this connection, it will be understood that biasing potentials are applied to the control electrodes 3 and 4 through separate terminals, as by the terminals 79 and 80. For simplicity, only the control electrode 3 nearest the cathode is used for emission control, including in its circuit the secondary winding 22 of transformer 23.

In the electron discharge device ilustrated in Fig. 15, the anode 6 is omitted, the cylindrical electrode 75 operating as a second anode, in the manner described in connection with Fig. 11; and the unsymmetrical arrangement of control electrodes is used as in Fig. 13. A tube having this structure may be employed in an unsymmetrical frequency converter circuit of the type illustrated in Fig. 16. In this circuit a source of voltage having a frequency $f_1$ is coupled by means of a transformer 81 to control the deflection of the electron streams between the two anodes 5 and 75. The transformer 81 includes a pair of secondary winding sections 82 and 83, connected in series between the control electrodes 3 and 4 by the coupling condenser 84. A source of voltage having a frequency $f_2$ is simultaneously impressed on the electrodes 3 and 4, thereby to control the electron emission. The connections between the source $f_2$ and the control electrodes include the transformer 85 comprising a primary winding 86 and two secondary windings 87 and 88. The output circuit connected between the anodes 5 and 75 and the cathode 2 includes the primary winding of a transformer 89 to which is connected at a tap 90 the positive terminal of a source of anode voltage +B.

Figure 16:
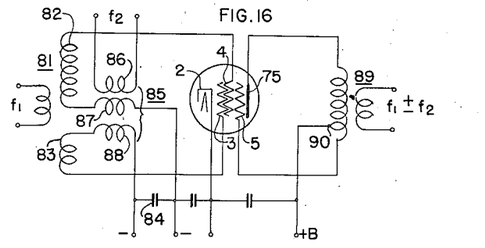

The fundamental operation of the circuit shown in Fig. 16 is identical with that described in connection with the circuit of Fig. 6, the turn ratios of the coupling transformers being adjusted to compensate for the dissymmetry produced by the unsymmetrical positioning of the control electrodes 3 and 4 and the anodes 5 and 75. In both cases, the relative numbers of turns of the transformers are such that the voltage of frequency $f_1$ does not affect the electron emission and the voltage of frequency $f_2$ does not appear between the two anodes.

Figure 15:
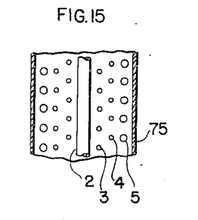
Figures 17, 18:
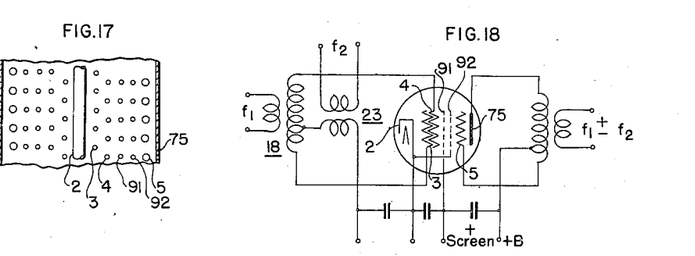

In Fig. 17 I have illustrated a still further modification of my improved electron discharge device, in which an additional pair of electrodes, comprising a helical screen grid 91 and a helical suppressor grid 92, are included in the device in addition to the elements described in discussing Fig. 15. A frequency-converter circuit including an electron discharge device having these two additional electrodes embodied therein is illustrated in Fig. 18. In this circuit the suppressor grid 92 is shown as being connected within the tube to the cathode 2 and the screen grid as being connected to the positive terminal + screen, so that the latter grid is maintained at a positive potential below that of the anodes 5 and 75. The fundamental operation of this circuit is essentially the same as that of each of the previously described frequency-converter circuits. Accordingly, a description thereof is deemed to be unnecessary.

Figure 19:
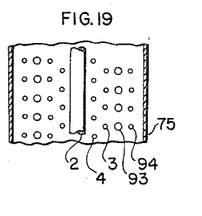
Figure 20:
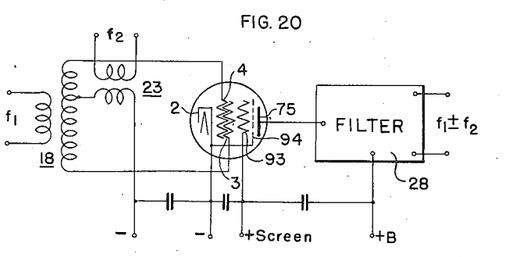

In the electron discharge device illustrated in Fig. 19, the metal cylinder 75 functions as a single anode and the helical electrode 93 functions as a screen grid. A helical suppressor grid 94 is provided which is interposed between the electrode 93 and the anode 75. The circuit connections for the application of this electron discharge device to a frequency-converter circuit are illustrated in Fig. 20, which differs from the circuit shown in Fig. 18 only in that a single anode is employed, the screen grid is formed by the electrode 93, and the electrode 94 is connected to the cathode 2 to form a suppressor grid.

Figure 21:
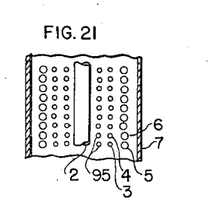
Figure 22:
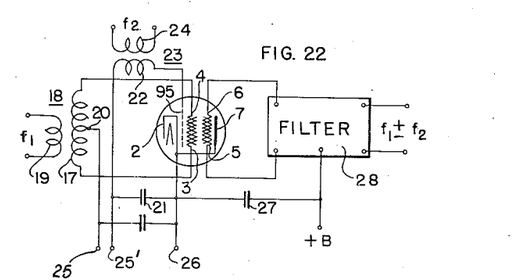

In the structure of the electron discharge device shown in Fig. 21, an additional control electrode 95 is provided between the cathode 2 and the interleaved helical control electrodes 3 and 4. This electrode, when connected in a frequency-converter circuit, operates independently of the control electrodes 3 and 4 to control the electron emission from the cathode 2 to the anodes 5 and 6, the control electrodes 3 and 4 operating solely to deflect the electron streams alternately from each anode toward the other. It is not essential that the turns of the control electrode 95 should register with those of control electrodes 3 and 4; but if they do register as shown in Fig. 21, they will tend to prevent electrons from reaching electrodes 3 and 4, even if these are slightly positive in potential. This may permit little or no negative biasing, at terminal 25, of the control electrodes 3 and 4, with a consequent increase in normal emission. A frequency-converter circuit having embodied therein the tube of Fig. 21 is illustrated in Fig. 22, from which it will be seen that the only differences between the circuit of this figure and that of Fig. 6 reside in the connection of one terminal of the winding 22 to the additional electrode 95 rather than to the electrodes 3 and 4 through the winding 17, and the connection of the other terminal of winding 22 to a separate source of bias at terminal 25'.

Figure 24:
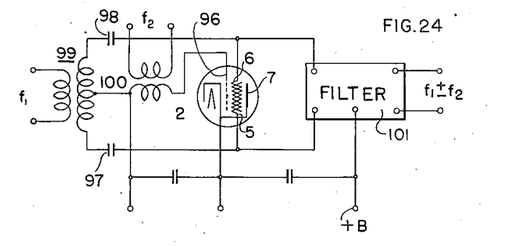

The form of my improved electron discharge device illustrated in Fig. 23 includes the two anodes 5 and 6, the cathode 2, and a single electrode 96 for controlling the electron emission from the cathode 2 to the two anodes. This electron discharge device functions as a relay with respect to the electron emission control in a manner analogous to the usual three-electrode vacuum tube. However, with respect to the electron deflection control, it has no relay action, behaving in this respect in a manner analogous to a rectifier. Thus, in the circuit illustrated in Fig. 24, which includes a device having the construction shown in Fig. 23, the anodes 5 and 6 are connected through blocking condensers 97 and 98 to the secondary of a transformer 99, receiving through its primary winding terminals a current having a radio frequency $f_1$. A voltage having a frequency $f_2$ may be impressed by a transformer 100 on the electrode 96 to vary the electron emission at a frequency $f_2$ which, in effect, varies the resistance between the anodes 5 and 6 at this same frequency $f_2$. This latter frequency may be considered to be the modulating frequency. It follows that a component potential difference is built up between the anodes 5 and 6 having a frequency which is the sum or difference of the frequency $f_1$ and the frequency $f_2$. By proper design of the filter 101 connected to the anodes 5 and 6, a voltage of a frequency equal to either the sum or the difference of the frequencies $f_1$ and $f_2$ may be developed across the output terminals of the filter.

Figure 25:
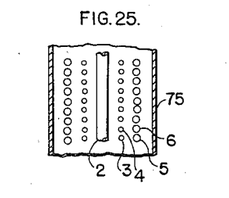
Figure 26:
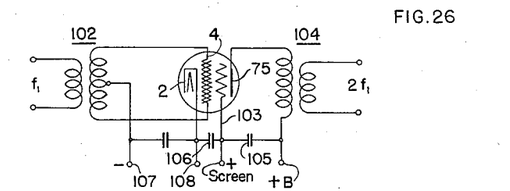

Referring to Fig. 25 of the drawings, there is illustrated a form of my improved electron discharge device which is particularly applicable for use in a frequency-multiplying system. This physical embodiment of my invention comprises the cathode 2, surrounded by the two interleaved helical control electrodes 3 and 4 and, at a greater radial distance, by the two interleaved helical anodes 5 and 6. The elements noted are enclosed within the cylindrical member 75. The application of this form of my invention to a frequency-doubler system is illustrated in Fig. 26, wherein the two control electrodes 3 and 4 are connected to the respective terminals of the secondary winding of a transformer 102 and the two anodes are connected together to form a single electrode 103 which is positioned between the control electrodes and the metal cylinder 75 in the manner of a screen grid. The output circuit of the system includes the primary winding of a transformer 104 connected between the member 75, which operates as an anode, and the cathode 2 by means of condensers 105 and 106, which shunt the source of potential +B employed to excite the electrodes 75 and 103. It will be understood that the control electrodes are biased to the proper negative potential by the application of voltage between the terminals 107 and 108.

In the operation of the grequency-doubler system shown in Fig. 26, it will be understood that the electrostatic field between the control electrodes periodically reverses polarity and the electron streams are deflected toward one or the other of the two electrodes 5 and 6 comprising the screen grid 103. Further, during each reversal of the electrostatic field between the two control electrodes 3 and 4, the electron streams are directed between the two electrodes 5 and 6 and toward the anode 75. It follows that, during each cycle of the alternating voltage impressed on the control electrodes, the electron streams are twice directed between the anodes 5 and 6 and toward the anode 75. In this manner the frequency of alternations in the anode current is double the frequency of the control voltage impressed on the transformer 102. This system may advantageously be employed in transmission systems of the frequency-modulation type.

While the electron deflection control has been described as comprising a pair of control electrodes which, through their electrostatic action on the electron stream, produce the desired alternate deflection of the electron streams toward each of two anodes, it is possible to obtain a similar operation by ultilizing a varying magnetic field to produce the desired electron stream deflection. Thus, in Fig. 27 there is illustrated an electron discharge device which comprises a cathode 109, about which are concentrically disposed a plurality of axially extending filamentary grid sections 110 which are connected together within the tube to form a control electrode. Concentrically disposed with respect to the cathode 109 are a plurality of axially extending filamentary anode sections 111, alternate ones of which are connected together within the tube to form a pair of interleaved anodes. The number of grid sections is half the number of anode sections, each grid section registering with the passage between two adjacent anode sections. A shield 112 surrounds the assembly of elements and is, in turn, enclosed within an evacuated envelope 113 having a degree of vacuum sufficient to insure substantially pure electron emission. In order to reduce eddy currents in the shield, a slit 112' is provided therein which extends longitudinally along the shield. For the purpose of deflecting the electron streams between the two anodes, a winding 114 is placed around the envelope and includes connections for excitation by a suitable control current.

Figure 27:
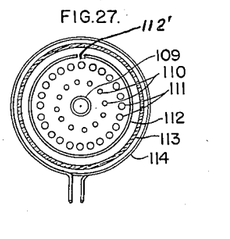
Figure 28:
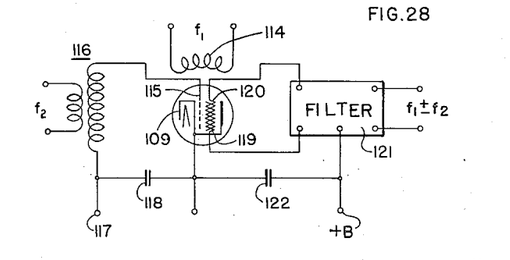

A frequency-converter circuit having included therein an electron discharge device of the construction illustrated in Fig. 27 is shown in Fig. 28. In this circuit a source of alternating voltage having a frequency $f_1$ is impressed on the terminals of the winding 114 and a second source of alternating voltage having a frequency $f_2$ is impressed, through the transformer 116, on the emission control electrode 115, formed by the connected filamentary sections 110. The control electrode 115 is biased to the proper negative potential by means of a source of voltage (not shown) connected between the cathode and the terminal 117 and shunted by a by-pass condenser 118. The two anodes 119 and 120, formed by the alternately connected filamentary sections 111, are connected in an output circuit which includes the input terminals of a filter 121 and a source of anode voltage +B shunted by a by-pass condenser 122.

In the operation of the circuit shown in Fig. 28, emission of electrons from the cathode 109 to the two anodes is varied at a frequecy $f_2$ by virtue of the voltage applied to the control electrode 115. The electron streams emitted to the two anodes are deflected alternately toward one and then the other of the two anodes by the alternating magnetic field produced within the discharge device by the winding 114. From the foregoing description, it will be seen that in this modification of my invention deflection of the electron streams is accomplished magnetically, as contrasted to the previously described modifications wherein electrostatic deflection of the electrons is utilized to produce the desired controlling action.

Although in certain of the various embodiments of my improved electron discharge device the control electrodes and the anodes have been described as being helical in form, it will be understood that they may be made in other forms without departing from the invention herein disclosed. Thus, they may be made in the form of interleaved annular coaxial sections or turns, each single turn lying in a plane and all turns of each electrode being of the same diameter. Of course, the several turns of each electrode would, in this case, be electrically connected. More generally, the turns of the last-mentioned form of the elements, or of the helical form of the elements, may be made of any desired configuration as, for example, flattened or elliptical. Alternatively, the pairs of interleaved electrodes may be formed of co-planar sections, the sections of one electrode alternating with, and closely spaced with respect to, the corresponding sections of the other electrode. In this connection it will be understood that the term "section" appearing in this specification and in the appended claims is used in its broad sense to denote one of the elemental components of any form of electrode. For example, in the helical form described, even though the electrodes are actually continuous helices and the electron stream is actually continuous, to aid in the analysis of the operation of the tube the electrodes may be considered to comprise a plurality of elemental turns or sections, and the electron stream may be considered to be made up of a plurality of substantially annular streams bonded by the adjacent sections of the two electrodes. In such a structure the term "section", thus, refers to any single elemental component or turn. In the planar form of electrode, the term refers to any single conductor electrically connected to the common connection between the several conductors.

It will further be understood that the term "interleaved", appearing herein, is used broadly to denote the relation of the two electrodes by which corresponding elemental sections, or surfaces, of each electrode directly exposed to the cathode alternate with corresponding sections, or surfaces, of the other, whether or not such sections or surfaces are actually at equal distances from the cathode. For example, in the form of my improved device, wherein the corresponding turns or sections of the two control electrodes have different diameters and do not register with each other, the electrodes may be regarded as interleaved. Again, in the embodiment wherein only one helical anode is provided and the cylindrical electrode is connected to function as the second anode, the helical inner surface of the cylindrical electrode lying between the turns of the helical electrode and directly exposed to the cathode may be regarded as an anode interleaved with the helical anode, since the electron streams are alternately deflected between the sections of this surface and the turns of the helical anode.

While I have described what I at present consider the preferred embodiments of my invention, it will, of course, be understood that I do not wish to be limited thereto, since many modifications in structure of the electron discharge device disclosed and of the circuits employed may be made, and I contemplate by the appended claims to cover all such modifications as fall within the true spirit and scope of my invention.

What is claimed is:

1. In a high-frequency translating system, an electron discharge device comprising, a pair of interleaved anodes, each of said anodes comprising a plurality of sections, a cathode for emitting electrons to said anodes, means for varying the rate of electron flow to said anodes and for separating said electrons into a plurality of streams, each of said streams dividing between a section of one anode and an adjacent section of the other anode, and separate means for alternately deflecting each of said streams toward one and then the other of its respective adjacent anode sections.

2. In a high-frequency translating system, an electron discharge device comprising, a pair of interleaved anodes, each of said anodes comprising a plurality of sections, a cathode for emitting electrons to said anodes, means for varying the rate of electron flow to said anodes and for separating said electrons into a plurality of parallel streams, each of said streams dividing between a section of one anode and an adjacent section of the other anode, and separate means for alternately deflecting each of said streams toward one and then the other of its respective adjacent anode sections.

3. In a high-frequency translating system, an electron discharge device comprising, a pair of anodes, each of said anodes including a plurality of sections alternating with and closely spaced with respect to the corresponding sections of the other, a cathode for emitting electrons to said anodes, a pair of control electrodes interposed between said anodes and said cathode, each of said control electrodes including a plurality of sections alternating with and closely spaced with respect to the corresponding sectitons of the other control electrode, means for varying the rate of electron flow to said anodes and for separating said electrons into a plurality of streams, each of said streams dividing between a section of one anode and an adjacent section of the other anode, and separate means including said control electrodes for alternately deflecting each of said streams toward one and then the other of its respective adjacent anode sections.

4. In a high-frequency translating system, an electron discharge device comprising, a pair of anodes, a cathode for emitting electrons to said anodes, one of said anodes being helical and the other of said anodes comprising a member surrounding said one anode and having a continuous surface adjacent thereto but displaced therefrom, said one anode and the surrounding surface of said other anode comprising a plurality of sections, and control means operative to separate said electrons into a plurality of streams, each of said streams dividing between a section of said helical anode and a section of said surrounding surface of said other anode, and further operative alternately to deflect each of said streams toward one and then the other of its respective adjacent anode sections.

5. In a high-frequency translating system, an electron discharge device comprising, a pair of interleaved anodes, each of said anodes comprising a plurality of sections, a cathode for emitting electrons to said anodes, control means for separating said electrons into a plurality of streams, each of said streams dividing between a section of one of said anodes and an adjacent section of the other anode, and for alternately deflecting each of said streams toward one and then the other of its respective adjacent anode sections, and means comprising shielding means surrounding said anodes for repelling toward said anodes electrons passing between said anodes.

6. In a high-frequency translating system, an electron discharge device comprising, a pair of interleaved anodes, each of said anodes comprising a plurality of sections, a cathode for emitting electrons to said anodes, means for varying the rate of electron flow to said anodes and for separating said electrons into a plurality of streams, each of said streams dividing between a section of one of said anodes and an adjacent section of the other anode, means for alternately deflecting each of said streams toward one and then the other of its respective adjacent anode sections, and means including shielding means surrounding said anodes for repelling toward said anodes electrons passing between said anodes.

7. In a high-frequency translating system, an electron discharge device comprising, a pair of interleaved anodes, each of said anodes comprising a plurality of sections, a cathode for emitting electrons to said anodes, control means for separating said electrons into a plurality of streams, each of said streams dividing between a section of one of said anodes and an adjacent section of the other anode, and for alternately deflecting each of said streams toward one and then the other of its respective adjacent anode sections, shielding means surrounding said anodes, and a shielding electrode interposed between said anodes and connected to said shielding means.

8. In a high-frequency translating system, an electron discharge device comprising, an evacuated envelope, a cathode, a control electrode, and a pair of interleaved anodes disposed within said envelope in the order named, means including said control electrode for separating said electrons into a plurality of streams, each of said streams dividing between a section of one anode and an adjacent section of the other anode, and means for producing a varying magnetic field between said cathode and said anodes thereby alternately to deflect each of said streams toward one and then the other of its respective adjacent anode sections.

9. In a high-frequency translating system, an electron discharge device comprising, a pair of interleaved anodes, each of said anodes comprising a plurality of sections, a cathode surrounded by said anodes and adapted to emit electrons thereto, a pair of control electrodes interposed between said cathode and said anodes, each of said electrodes having sections registering with the sections of one of said anodes, the sections of said electrodes being disposed in staggered relation with respect to each other with the sections of one of said electrodes surrounding the sections of the other of said electrodes, means including said control electrodes for varying the rate of electron flow to said anodes and for separating said electrons into a plurality of streams, each of said streams dividing between a section of one anode and an adjacent section of the other anode, and means for alternately deflecting each of said streams toward one and then the other of its respective adjacent anode sections.

10. In a high-frequency translating system, an electron discharge device comprising, a pair of interleaved anodes, each of said anodes comprising a plurality of sections, a cathode surrounded by said anodes and adapted to emit electrons thereto, a pair of control electrodes interposed between said cathode and said anodes, each of said electrodes having sections registering with the sections of one of said anodes, the sections of said electrodes being disposed in staggered relation with respect to each other with the sections of one of said electrodes surrounding the sections of the other of said electrodes, means including said control electrodes for varying the rate of electron flow to said anodes and for separating said electrons into a plurality of streams, each of said streams dividing between a section of one anode and an adjacent section of the other anode, means for alternately deflecting each of said streams toward one and then the other of its respective adjacent anode sections, and means for repelling toward said anodes electrons passing between said anodes.

11. In a high-frequency translating system, an electron discharge device comprising a pair of interleaved anodes, each of said anodes comprising a plurality of sections, a cathode for emitting electrons to said anodes, at least one control electrode interposed between said cathode and said anodes, means including said control electrode for varying the rate of electron flow to said anodes and for separating said electrons into a plurality of streams, each of said streams dividing between a section of one anode and an adjacent section of the other anode, and separate means for alternately deflecting each of said streams toward one and then the other of its respective adjacent anode sections.

12. In a high-frequency translating system, an electron discharge device comprising a pair of anodes, a cathode for emitting electrons to said anodes, one of said anodes being helical and the other of said anodes comprising a member surrounding said one anode and having a continuous surface adjacent thereto, but displaced therefrom, each of said anodes comprising a plurality of sections, a pair of control electrodes interposed between said cathode and said anodes each comprising a plurality of sections registering with the sections of one of said anodes, the sections of said control electrodes being disposed in staggered relation with respect to each other with the sections of one of said electrodes surrounding the sections of the other electrodes, means for controlling the rate of electron flow to said anodes and for separating said electrons into a plurality of streams, each of said streams dividing between a section of one anode and an adjacent section of the other anode, and means including said control electrodes for alternately deflecting each of said streams toward one and then the other of its respective adjacent anode sections.

13. In a high-frequency translating system, an electron discharge device comprising an evacuated envelope, a cathode for emitting electrons, a control electrode, and a pair of interleaved anodes disposed within said envelope in the order named, means including said control electrode for separating said electrons into a plurality of streams, each of said streams dividing between a section of one anode and an adjacent section of the other anode, and means including a winding positioned external to said envelope for producing a varying magnetic field between said cathode and said anodes, thereby alternately to deflect each of said streams toward one and then the other of its respective adjacent anode sections.

14. In a high-frequency translating system, an electron discharge device comprising a pair of interleaved anodes, each of said anodes comprising a plurality of sections, a cathode for emitting electrons to said anodes, means including a control electrode interposed between said cathode and said anodes for varying the rate of electron flow to said anodes and for separating said electrons into a plurality of streams, each of said streams dividing between a section of one anode and an adjacent section of the other anode, means including a pair of additional electrodes interposed between said control electrode and said anodes for alternately deflecting each of said streams toward one and then the other of its respective adjacent anode sections and at least one additional electrode interposed between said second-named electrodes and said anode.

15. In a high-frequency translating system, an electron discharge device comprising a pair of interleaved anodes, each of said anodes comprising a plurality of sections, a cathode for emitting electrons to said anodes, means including a control electrode interposed between said cathode and said anodes for varying the rate of electron flow to said anodes and for separating said electrons into a plurality of streams, each of said streams dividing between a section of one anode and the adjacent section of the other anode, means including a pair of additional electrodes interposed between said control electrode and said anodes for alternately deflecting each of said streams toward one and then the other of its respective adjacent anode sections and at least one additional electrode interposed between said second-named electrodes and said anode, and means for repelling toward said anodes electrons passing between said anodes.

LOUIS A. HAZELTINE.